(12) United States Patent
Bodden et al.

(10) Patent No.: US 7,765,094 B2
(45) Date of Patent: Jul. 27, 2010

(54) METHOD AND SYSTEM FOR PERFORMANCE PROFILING OF SOFTWARE

(75) Inventors: Eric Bodden, Uebach-Palenburg (DE); Christopher James Robin Goodfellow, Kettering (GB); Howard Hellyer, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1196 days.

(21) Appl. No.: 11/253,964

(22) Filed: Oct. 19, 2005

(65) Prior Publication Data

US 2006/0101421 A1 May 11, 2006

(30) Foreign Application Priority Data

Oct. 21, 2004 (GB) .................. 0423362.3

(51) Int. Cl.
*G06F 9/45* (2006.01)
(52) U.S. Cl. ............... 703/22; 717/127; 717/130; 717/158
(58) Field of Classification Search .................. 703/22; 717/130, 131, 158, 127; 702/188, 182
See application file for complete search history.

(56) References Cited

U.S. PATENT DOCUMENTS 6,275,981 B1 * 8/2001 Buzbee et al. ............... 717/158
6,356,859 B1 * 3/2002 Talbot et al. ................. 702/188
6,519,766 B1 * 2/2003 Barritz et al. ................ 717/130
6,735,758 B1 * 5/2004 Berry et al. .................. 717/130
6,760,903 B1 * 7/2004 Morshed et al. ............. 717/130
2003/0018960 A1 * 1/2003 Hacking et al. .............. 717/158
2004/0111708 A1 * 6/2004 Calder et al. ................ 717/131
2005/0120341 A1 * 6/2005 Blumenthal et al. ......... 717/158
2005/0132336 A1 * 6/2005 Gotwals et al. ............. 717/127
2006/0041400 A1 * 2/2006 Nilson et al. ................ 702/182

OTHER PUBLICATIONS

Hagerty et al., "Real-time discrimination of battle field ordinance using remote sensing data", IEEE, 2000.*
Briand et al., "A comparison and integration of capture-recapture models and the detection profile method", IEEE 1998.*

* cited by examiner

*Primary Examiner*—Paul L Rodriguez
*Assistant Examiner*—Kandasamy Thangavelu
(74) *Attorney, Agent, or Firm*—Jordan Law LLC

(57) ABSTRACT

Performance profiling of software by producing a performance profile of a software processing unit and performing statistical analysis on the performance profile by matching the performance profile with at least one additional performance profile. An algorithmic approach is used to match data related to processes and/or threads and/or similar processing units (PU) over multiple performance profiles. One purpose of the matching algorithm is to identify such PU in order to enable computation of an accumulated or averaged dataset over multiple profiling periods. Various matching strategies, filters, and preprocessing techniques are described, together with level of reliability estimation.

23 Claims, 4 Drawing Sheets

METHOD AND SYSTEM FOR PERFORMANCE PROFILING OF SOFTWARE

FIELD OF THE INVENTION

This invention relates to performance profiling of software in general, and particularly, although not exclusively, to comparing and averaging collected profiles as well as estimating the reliability of profiles. The invention finds application in matching of processing units based on statistical analysis of units and their child elements.

BACKGROUND

Performance profiles consist of a set of data which is gathered by a process (the profiler) that is running concurrently with a set of other processes/applications in order to monitor performance of those processes/applications. The dataset gathered is called a profile.

It is desirable to identify associated blocks of statistical information in a hierarchy such as the output from a simple system profiler showing CPU time split by processes, which have child threads also split by time, which have different code modules in turn, so as to allow combination and comparison of information relating to those units. Previously known solutions to this problem involve matching the names of units.

However, this approach has the disadvantage that while this is an ideal solution when units are named, and common units are always commonly identified, this solution falls apart when units are unidentified.

A need therefore exists for matching of processing units based on statistical analysis of units and their child elements (automation of high quality performance profiling by statistical means) wherein the abovementioned disadvantage may be alleviated.

Furthermore, applications in general tend to show differences in such profiles due to indeterminism introduced by distinct random factors such as processor affinity, process scheduling, and so forth. During profiling, those differences show up in different performance values for equivalent processing units. Since processing units are generally not labeled, those differences make the task of finding a relation between equivalent units over multiple profiling periods difficult. These differences, which are random (in a stochastic sense, so not being arbitrary) over a set of profiles, may be called the internal noise (IN) of the profiles. It is desirable to reduce this noise and to estimate its dimension.

In addition to such internal noise, there sometimes exists what may be called external noise. Such noise is characterized by a very high impact on the profile data in comparison to the impact of internal noise. Such external noise is unexpected noise. It is caused by processes/applications besides the profiler process and the applications being profiled. For example, in runtime environments based on virtual machines, a garbage collector might cause significant external noise. In comparison to internal noise, external noise has no stochastic distribution (it is arbitrary, not random). A performance profile that contains significant external noise is considered not clean, and may simply be called a bad profile or a bad run. It is desirable to identify bad runs.

SUMMARY

In accordance with a first aspect of the present invention there is provided a method of performance profiling software, comprising: producing a performance profile of a software processing unit; and performing statistical analysis on the performance profile. In accordance with a second aspect of the present invention there is provided a system of performance profiling software comprising means for producing a performance profile of a software processing unit; and means for performing statistical analysis on the performance profile.

BRIEF DESCRIPTION OF THE DRAWINGS

One system and method for matching of processing units based on statistical analysis of units and their child elements (automation of high quality performance profiling by statistical means) incorporating the present invention will now be described, by way of example only, with reference to the accompanying drawings, in which.

DETAILED DESCRIPTION

Figure 1:
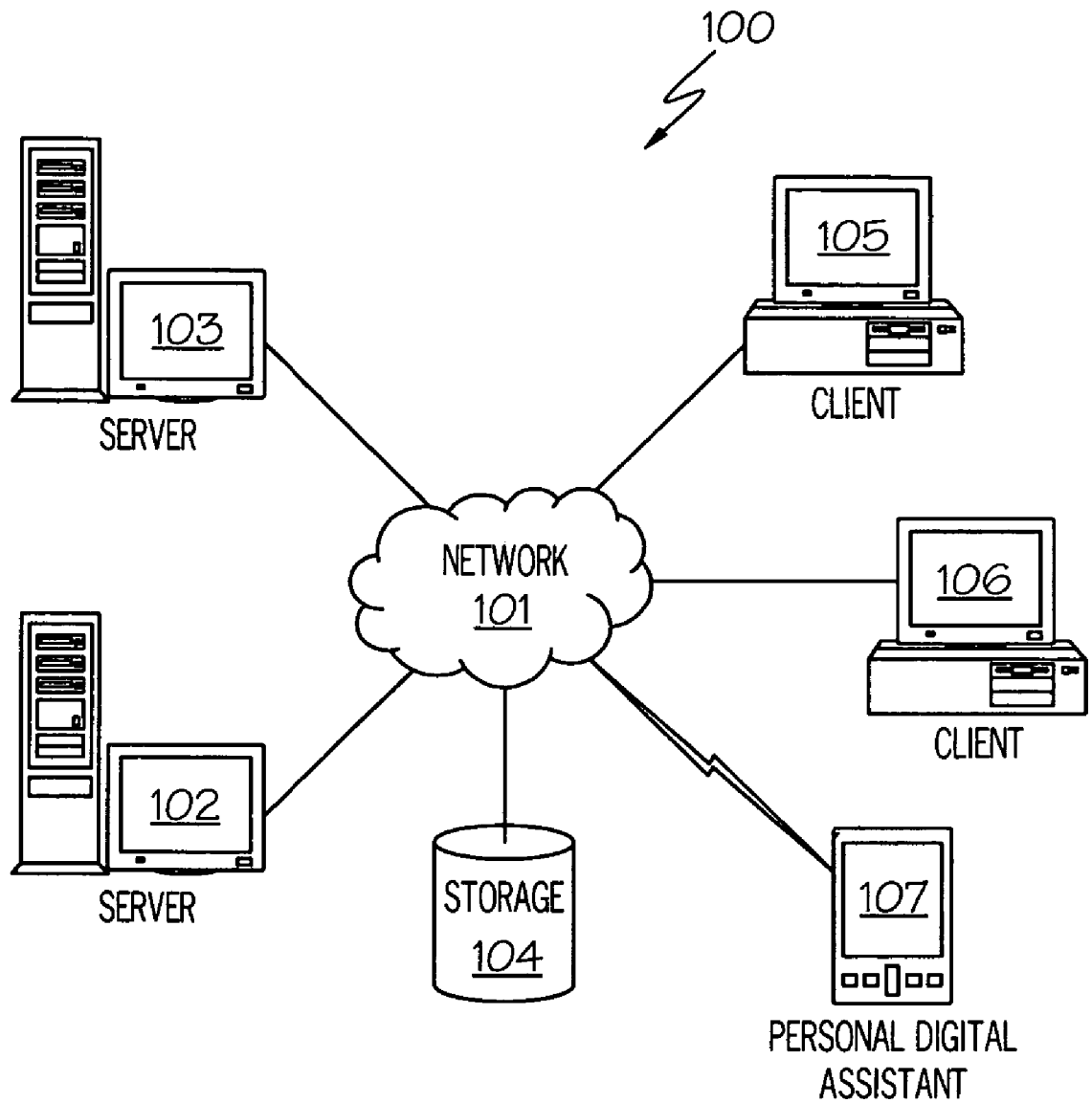
FIG. 1 shows a typical distributed data processing system in which the present invention is implemented in accordance with a preferred embodiment of the present invention.

Referring firstly to FIG. 1, a typical distributed data processing system 100 in which a preferred embodiment of the present invention is implemented contains network 101, which is the medium used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101.

Clients 105-107 may be a variety of computing devices, such as personal computers, personal digital assistants (PDAs), etc. Distributed data processing system 100 may include additional servers, clients, and other devices not shown. In the depicted example, distributed data processing system 100 includes the Internet with network 101 representing a worldwide collection of networks and gateways that use the TCP/IP suite of protocols to communicate with one another. Of course, distributed data processing system 100 also may be configured to include a number of different types of networks, such as an intranet, a local area network (LAN), or a wide area network (WAN).

FIG. 1 is intended as an example of a heterogeneous computing environment rather than as an architectural limitation for the present invention.

The present invention may be implemented on a variety of hardware platforms, such as server 102 or client 107 shown in FIG. 1.

As will be explained in more detail below, the preferred embodiment of the invention is based on an algorithmic approach to facilitate automated processing and evaluation of performance profiles. This comprises automated creation of such profiles as well as in particular automated evaluation, meaning comparison, averaging, accumulation, and similar processes applied to profiles, especially in order to gain performance profiles of certain accuracy. This employs an algorithmic approach to match data related to processes and/or threads and/or similar processing units (PU) over multiple performance profiles. The purpose of the matching algorithm is to identify such PU by certain characteristics as described below in order to enable computation of an accumulated or averaged dataset over multiple profiling periods. Multiple metrics are provided which enable implementation of a matching strategy. For different applications and operating systems, there can be different optimal solutions to this general matching problem. Although several of them addressed below, the present invention covers the general employment of such matching strategies with respect to performance profiles. Also, matching strategies may be combined in any combination/cascading to produce a new strategy as a whole; this cascading may considered as iterative deepening. Preprocessing techniques that lead to improvements of accuracy can also be employed. In addition, certain filters may be employed which are applied to the profile in order to check it for plausibility. A stochastic approach is employed to estimate a level of reliability (LOR) for a set of profiles collected of a distinct application, and may be combined to produce an overall average profile with a guaranteed level of reliability.

A preferred embodiment of the present invention is based on identifying associated blocks of statistical information in a hierarchy (an example is the output from a simple system profiler showing CPU time split by processes, which have child threads also split by time, which have different code modules in turn), so as to allow combination and comparison of information relating to those units.

A preferred embodiment of the invention aims to match common units by examining runtime statistics such as CPU usage. A unit can be grouped according to similar statistics. This, however, is far from simple, because the statistics gathered may have some degree of natural variation, which must be compensated for. Compensation is produced in the first instance by analyzing the natural variation using statistics such as Confidence Intervals to determine likelihood of a match and by cascading this principle to parent and child nodes. This would involve a scoring mechanism on each unit to determine the strength of the match, based both on its own closeness to other nodes and the scores of its children. This technique has advantages over solutions such as name matching, in that it is not dependent on reliable identifiers.

Bad profiles are filtered out before the matching of processing units take place; they are simply put into a set of bad profiles for further, manual, investigation.

Figure 2:
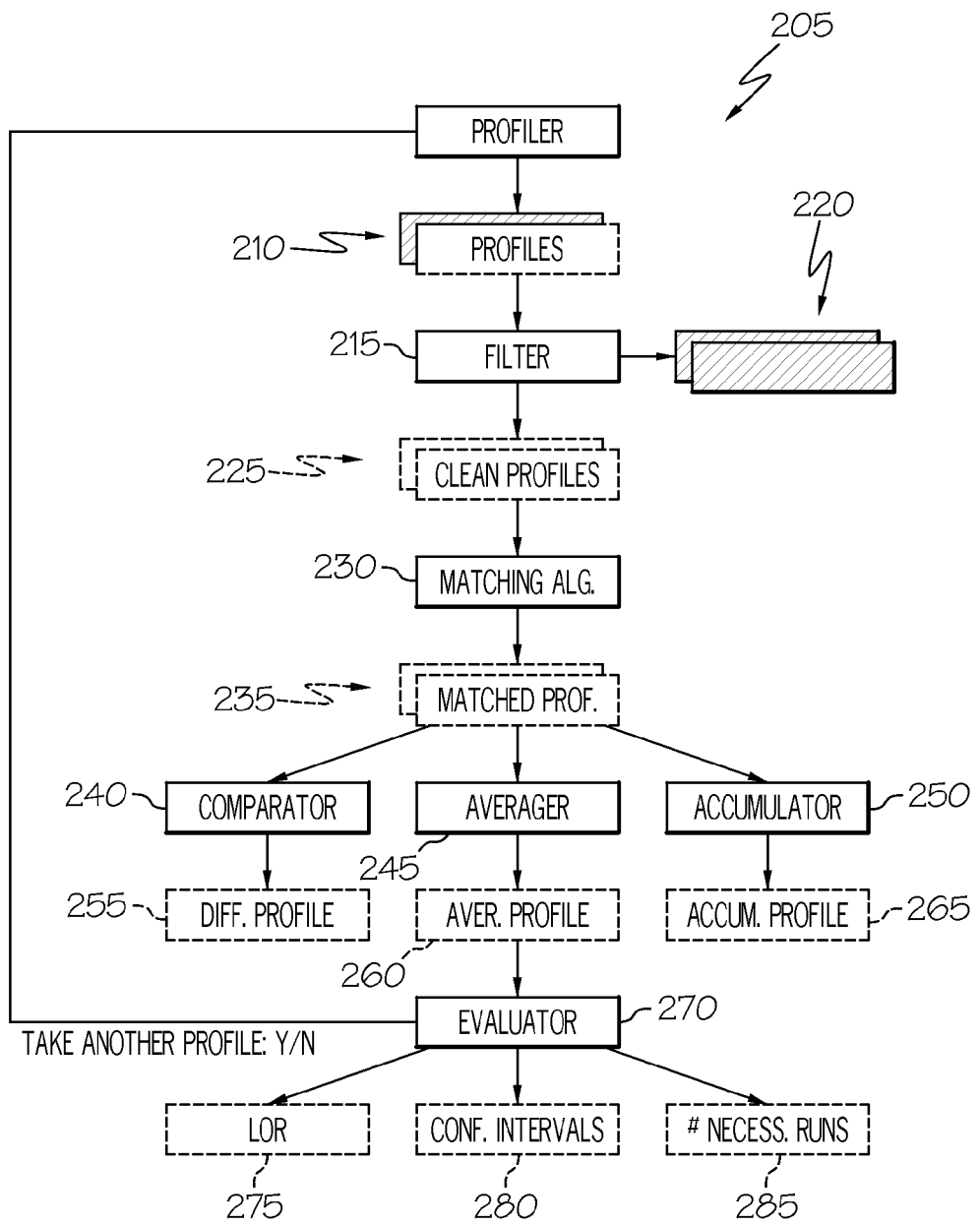
FIG. 2 shows a block-schematic representation of the overall profiling system utilized in the preferred embodiment.

FIG. 2 gives an overview of the overall system, in which a profiler 205 produces profiles 210 for analysis. The profiles are passed through a filter 215 to remove bad profiles 220, leaving only clean profiles 225, to which is applied a matching algorithm 230 to identify matched profiles 235. The matched profiles are applied to a comparator 240, an averager 245 and an accumulator 250 to produce respectively a difference profile 255, an average profile 260, and an accumulated profile 265, which are applied to an evaluator 270. The evaluator 270 produces evaluation estimates in the form of: level of reliability (LOR) 275, Confidence Intervals 280 and number of necessary runs 285. If the evaluator 270 determines that another profile is needed for evaluation, the system returns to the profiler 205 to obtain another profile for analysis as earlier described.

Two collections of processing units are looked at. These processing units have runtime statistics. In one of the collections, a measure of the natural variation of that statistic, the natural variation may be due to a number of reasons such as other concurrent units, processor affinity, memory availability, etc. This variance measure is used to identify which processing units from one collection match with a processing unit from the other collection.

These matches may not be one-to-one, however, but may be many-to-many. Consequently, further compensation may be needed. Each possible match is given a score. This score is a combination of the proximity of the match and the average score of the child matches. The average score of the children is a measure of which set of parent/child units from each of the possible matches from one collection best matches which set of parent/child units from the other collection.

Once each possible match has a score it would not be enough to simply take the higher matches, because there may be instances where a particular match scores highly, but this prevents another match which is necessary. The actual identification of matches therefore takes the following form:

1. Identify units with only one possible match, and take this as a valid match.
2. Remove matched units.
3. Repeat until no single possibility matches.
4. Identify units with two possible matches, take the highest score from each, and check for conflicts; if a conflict arises, choose the match with the greatest difference between its score and the other possibility.
5. Remove matched units.
6. Return to 1 if necessary (if one-to-one matches have been created by the removal of units.)
7. Repeat for units with three possible matches, and so on.

In some cases, many-to-many matches may be indistinguishable. This may be a valid result, however, as there may be multiple similar units in a single collection (i.e., multiple worker threads executing the same modules). In this case, a clustering technique can be applied, matching the top thread from one collection to the top thread from the other collection and so forth, thereby preserving any natural variation.

There is also the case of the first match, where, due to the lack of previous matches, variance information is not available and therefore statistics cannot be calculated. In such a case it would be necessary to default to a set confidence interval, which could be set quite wide because the proximity scoring would select the closest matches.

The matching strategy may be implemented using a 'strategy' pattern. Such a pattern is known from the publication "Design Patterns: Elements of Reusable Object-Oriented Software" by Gamma, Helm, Johnson & Vlissides, published by Addison Wesley, 1995, and need not be further described herein. It will be understood that the strategy pattern is only one possible exemplary way of implementing the matching strategy, and that although the strategy pattern is a convenient reusable design component finding application in object oriented languages such as Java or C++, other possible implementations of the present invention in languages such as C could use other matching strategies.

In such a strategy pattern, all necessary states such as the collected data of all processing units are to be exposed to the strategy for reading access. The aim of the strategy is to provide a relation between processing units (processes, threads, and similar) of a (possibly newly collected) profile, called the 'new profile' and a set of 'old profiles' that have been processed already. Also, strategies might be cascaded in order to form a decision tree that as a whole provides optimal matching.

For all following strategies it is assumed that the context of the data is known in such a way that processes can be distinguished from threads and other types of processing units. Thus processes only need to be matched against other processes, threads against other threads, and so forth. There can be several best matching strategies depending on the profiler and, even much more, on the application being profiled.

Thus, it is desirable not only to use a matching strategy as explained below, but also to persistently store the information about what strategy to use, in the performance profile or any data output by the profiler or the profiling framework itself. Also it is desirable to utilize a preprocessing technique such as described in the following.

Preprocessing by processor affinity: Processing units might have a fixed processor affinity which is consistent over multiple profiling runs. If this is the case, a preprocessing strategy can be applied as follows: If a processing unit of the 'new profile' was running on processor "A" at the time the profile was taken, reduce each set of possibly matching processes (being contained in the 'old profiles') to the set of processes which were running on processor "A" at the time the profile was taken as well.

Preprocessing by containment of certain characterized data: Processing units might be characterized by certain characteristic data such as, for example: What methods are executed during profiling time? For the case of Java applications being profiled: Does the processing unit call methods that were compiled by the just in time compiler? There might be other characteristic data depending of the domain and implementation of the application being profiled.

Preprocessing by relevance: Processing units below a certain percentage may simply be dropped from the list of units to match against due to a lack of relevance for the profile.

Matching on process unit identifiers: The profiler might be able to expose unique identifiers to processing units which are consistent over multiple profiling runs. If this is the case, the matching strategy is simply: Match a processing unit labeled "A" of the new profile with the unique equivalent processing unit also labeled "A" of the set of old profiles.

Simple matching on number of ticks/percentage of CPU usage: In the case where a consistent labeling as described above is not available, the only option is to consider the profiling data itself which is usually given by a measure of ticks (execution steps) the processing unit was able to execute in a given timeframe or an average percentage of CPU usage over a given timeframe. For the case that the given measure is the former, it is assumed that the number of ticks is normalized against the total number of ticks in order to compute the percentage of CPU usage: Percentage of CPU usage=Number of ticks of the processing unit/Total number of ticks Thus in the following only percentages are considered. It is assumed that no significant floating-point errors take place. Indeed, the techniques described here automatically ensure that values where floating point errors could become critical will not be considered during evaluation because those very values are usually so small that they are not of interest for the overall profile at all.

The simple matching strategy is suitable for heterogeneous distributions of percentages under the processing units to match against. The simple matching strategy is as follows: Match a processing unit with a percentage "P" of the 'new profile' with the processing unit with the closest percentage to "P" in the 'old profiles'.

Advanced matching on number of ticks/percentage of CPU usage through clustering: This strategy works generally as above. However, it takes into account the case where there are multiple processing units known to be equivalent in a single run Thus it applies to homogenous distributions of processing units. This can be, for instance, the case when being profiled is an application that dispatches multiple equivalent worker threads. Such equivalent units show up in the profile with similar percentages. That again makes the matching above useless in a sense as there are multiple processing units which have "a closest percentage" to "P". The simple approach would probably match multiple processing units of the 'new profile' against the one processing unit of the set of 'old profiles'. This would lead to inconsistency in the data since in that case some units would be preferred over others.

Figure 3:
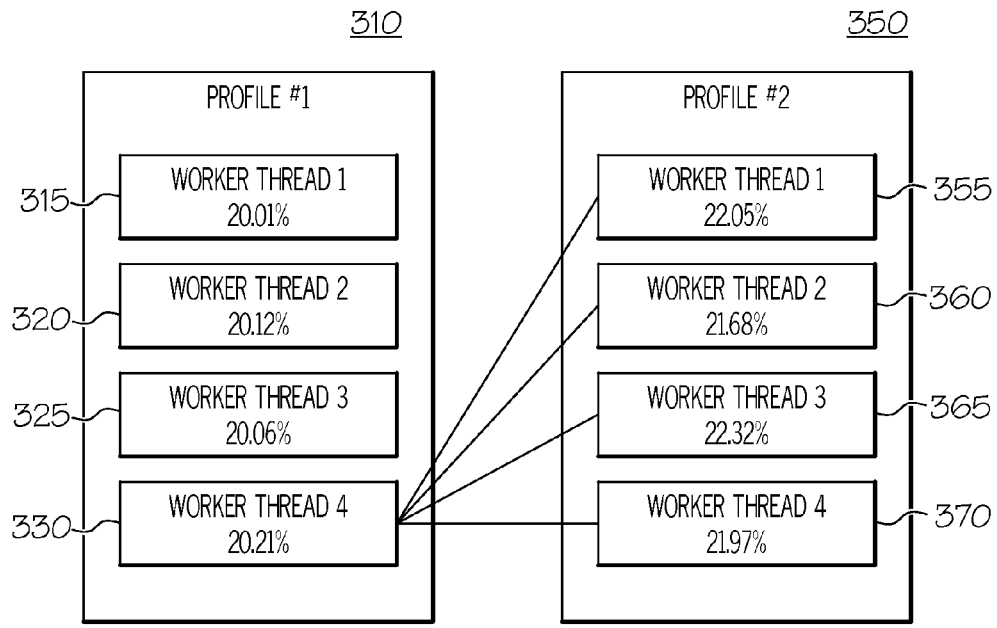
FIG. 3 shows a block-schematic representation of a matching strategy of mapping of worker threads using a 'naïve' percentage approach.

This is illustrated in FIG. 3, where mapping of worker threads using such a 'naïve' percentage approach would result in Worker Thread 4 (330) in Profile #1 (310) being mapped to Worker Thread 1 (355), Worker Thread 2 (360), Worker Thread 3 (365), and Worker Thread 4 (370) in Profile #2 (350) because Profile #1's Thread 4 has a percentage (20.21%) higher than those of all other threads in Profile #1 (20.01%-20.12%) and higher than all Profile #2's threads (21.68%-22.32%).

However, since such units are equivalent in a sense that they show similar percentages, the advanced strategy matches processing units by the internal ordering of their cluster (see FIG. 4): For a processing unit "A" with a percentage "P" of the 'new profile' determine the "cluster" of equivalent processing units of the set of 'old profiles' with the closest percentage to "P". Sort this cluster 'C old' by percentage. Also for "A" determine the "cluster" of equivalent processing units in the 'new profile'. Sort also this cluster 'C new' by percentage. Let "I" be the position (index) of "A" in 'C new'. Match "A" against the "$I^{th}$" processing unit of 'C old'.

Figure 4:
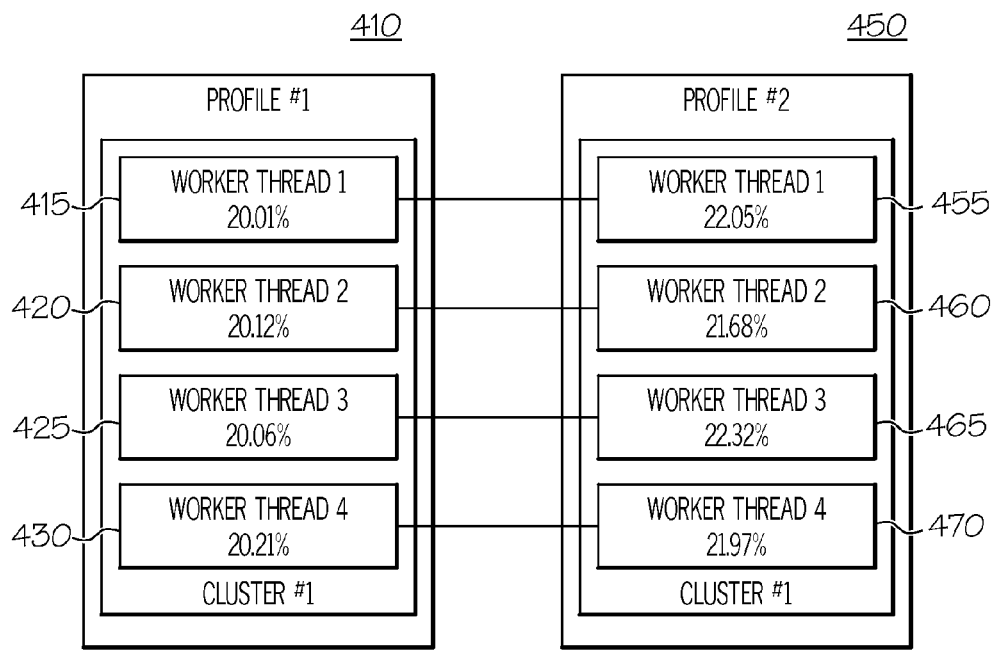
FIG. 4 shows a block-schematic representation of a matching strategy of mapping of worker threads using an 'advanced' (clustering) percentage approach.

As shown in FIG. 4, this 'advanced' strategy would result in Worker Threads 1-4 (415, 420, 425, 430) in Cluster #1 in Profile #1 (410) being mapped respectively to Worker Threads 1-4 (455, 460, 465, 470) in Cluster #1 in Profile #2 (450), all threads having the same percentages as those in FIG. 3.

The advantage of this 'advanced' strategy is that equivalent processing units are treated as one unit (cluster) and thus treated in the same way, but on the other hand the strategy allows for some of the units of a certain cluster to stand out from others, since it matches by index.

The challenge for this kind of clustering approach is to find the right mechanism to cluster the processing units. However, since the most important processing units with this "nature" of having significant and similar percentages are worker threads, one can usually employ a simple 'k-Means' clustering with k being the number of workers dispatched by the application being profiled. Since this k is usually known beforehand this makes the resulting heuristic highly accurate.

Another, faster approach would be to only define a maximum distance that defines a cluster by assembling only those processing units in one cluster that do not exceed this distance with respect to their internal mean.

Figure 5:
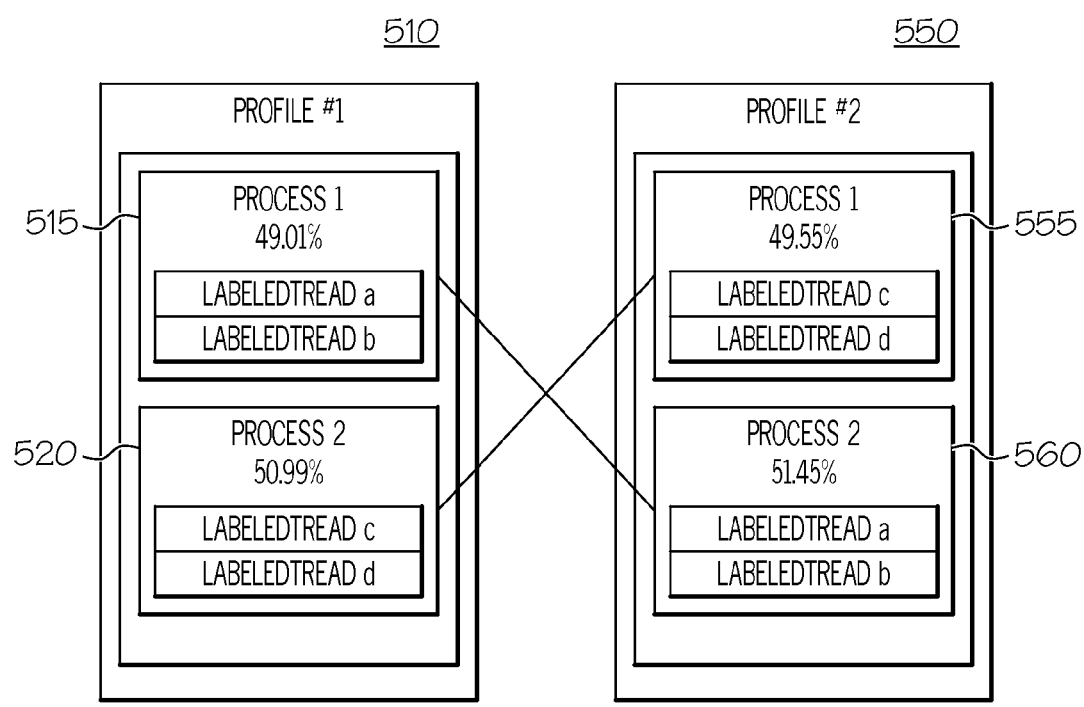
FIG. 5 shows a block-schematic representation of a strategy of matching on labels of sub-units.

Combined approach by recursion: Assume the situation where the profiles show processing units on one level (say the top level for instance) which are not labeled, where on deeper (child) levels, they are labeled. FIG. 5 illustrates this situation. In this case, the units can be matched according to a score that reflects how well subunits of each unit match. This matching on subunits can be again a matching by name or a matching on percentages. In general each subunit that matched with an appropriate subunit of the unit candidate contributes to a higher score of this parent unit. One typical example can be described by the following situation:

The profile contains processing units on the three levels—Process, Thread, Method.

The process of interest always has the labeljava.exe (however there might be other processes with the same label in one profile).

Threads are not labeled.

Methods are labeled.

As shown in FIG. 5, this strategy of matching on labels of subunits would result in Process 1 (515) having Labeled Thread a and Labeled Thread b in Profile #1 (510) being matched to Process 2 (560) having Labeled Thread a and Labeled Thread b in Profile #2 (550), and in Process 2 (520) having Labeled Thread c and Labeled Thread d in Profile #1 (510) being matched to Process 1 (555) having Labeled Thread c and Labeled Thread d in Profile #2 (550).

In this situation the following algorithm, employing recursion, could be used for matching the units to their correspondent partners from the already merged profile: Assume it is desired to match a process from the new profile. Cluster processes of the merged profile by name. {e.g., 'java.exe'). Take one of the processes of the cluster and iterate over its threads. In process of the 'new profile', also iterate over the threads. Compare the thread of the 'new profile' and the one of the merged profile recursively as above: Iterate over the methods of the thread picked from the merged profile. Also iterate over the methods of the thread picked from the new profile. For each method name that is contained in both those threads, raise the score of the thread by a certain value. Feed scores through to processes: The score of a process is the sum of the scores of its threads.

As a result of this algorithm, scores will be given to the processing units in such a way that even though process names might be ambiguous and thread names are not given, the correct processes/threads can be matched to each other by looking at their subunits, the methods.

The way the scores are distributed is crucial to the success of this variant. Scores should firstly be normalized against the number of subunits and secondly they might need to be weighted according to the percentage of a processing unit in the case where unit labels might be ambiguous.

Also it may be noted that this approach does not necessarily require even having any of the units contain any labels at all. Even in the case where all levels of units (such as processes, threads, modules, methods, etc.) are unlabeled, a match can be made on the statistical distribution of the subunits rather than on their labels. A parent unit gets a high score if and only if the distribution of its subunits is similar to the distribution of subunits of the parent unit that is being tried to match against. Thus, the cascading algorithm as described above in general leads to an optimal solution for the matching problem. It is necessary simply to recurse through the treelike hierarchies of the profiles and on each level has to employ the best strategy possible (matching on labels, percentages, etc.—see above). It should be noted that one can of course transform the algorithm described above to an algorithm that performs similar work on different processing units other than methods, threads, and so on.

There might be such small values for some processing units that during the capture of some of the profiles those units do not show up at all. Such units must however still be considered during averaging of profiles. For example, assume a processing unit is able to execute eight steps/ticks during the first of eight runs, but later not a single step more. In that case, though in the "new" profiles #2 to #8 this unit does not show up at all, its averaged value must still be lowered every time by the appropriate amount in order to still have all values add up to 100% in the averaged profile:

|  | Run# | | | | | | | |
|---|---|---|---|---|---|---|---|---|
|  | 1 | 2 | 3 | 4 | 5 | 6 | 7 | 8 |
| PU Ticks | 8 | 0 | 0 | 0 | 0 | 0 | 0 | 0 |
| Average | 8 | 8/2 | 8/3 | 8/4 | 8/5 | 8/6 | 8/7 | 8/8 |

As mentioned above and shown in FIG. 2, only those profiles are taken into account for further processing that do not exceed a certain level of external noise. This external noise can be measured in various ways, such as follows (single profile tests—SPT—are distinguished from multi-profile tests—MPT, the former checking the internals of a single profile for plausibility, the latter checking the internals of the 'new profile' for plausibility with respect to the internals of the profiles seen so far).

SPT: Minimal number of ticks/percentage of a single processing unit: Usually besides the application being profiled there should be no processing units employing much processing time on the same machine, because this would automatically lead to inconsistent values. So this test checks if there is a single process being above a threshold value measured in number of ticks or as percentage in the given profile. If there are multiple processing units expected, this technique can be extended to multiple units in the profile as well. If processing units can be uniquely identified by some means, it can even be assured that the right processing unit is above this threshold.

SPT: Minimal trace time/overall number of ticks: Profiles usually have to be taken over a suitably large amount of time in order to get a good average of the profiled application. Thus, the resulting profile should be tested to contain at least a minimal number of ticks to have been running for at least a certain minimal amount of time.

MPT: Test on same suggested matching strategy: As mentioned above, the optimal matching strategy is a property of the application being profiled as well as of the profiler. Thus, at the end of a profiling run, it is convenient to have the optimal matching strategy, for the profile that was taken, logged into the profile itself. For consistency, all profiles being processed as a unit (meaning those being averaged/compared/accumulated etc.) should contain the same suggested matching strategy.

MPT: Test on same environment: Depending on the capabilities of the profiler, the profiles should be tested to have been created under the same environmental circumstances (e.g., processor type and speed, number of processors, amount of memory, operating system, use of a certain virtual machine and so forth).

MPT: Test on deviation of trace cycles: If the profiler is not capable of running always for a fixed number of trace cycles, we suggest checking for a certain maximal deviation in the number of trace cycles/total ticks per profile, since profiles taken over different periods of time do not always lead to consistent values. However, there might also be situations where the latter could be the case so this test may be considered as optional.

As described in the following section, an aim of a preferred embodiment is to provide a metric for profiles that reflects the level of reliability (or consistency) of those profiles. The higher this level, the more one can trust the results gained from those profiles and the more meaningful, e.g., an averaged profile will be.

The calculation of this LOR is performed in three steps: First (Step 1) a confidence interval (CI) is determined for each processing unit of a set of profiles. Then (Step 2) one overall value (the LOR) is calculated based on those CIs. This approach facilitates incremental processing and thus enables performance profiles to take and evaluate profiles until a certain LOR is reached. As a result, one can gain a fully automated performance framework by iterated profiling and evaluation that always outputs profiles that match the personal minimum quality requirements. The number of necessary runs to fulfill the requirements can be calculated on the fly (Step 3).

Step 1: Calculation of confidence intervals: For each processing unit in the new profile:

Match this unit with the units of the profiles seen so far, employing one of the matching strategies mentioned above
- Let "M" be the arithmetic mean of those units over all profiles
- Let "D" be the standard deviation of those units over all profiles
- Let "CI" be the confidence interval for this unit as follows: CI:=StudentT(t, N−1) * D/(M * sqrt(N))
- Let the processing unit with the worst CI be "worstPU", its deviation "worstPU.D", its mean "worstPU.M" and its CI "worstPU.CI"

This all with "N" being the number of profiles including the 'new profile', "sqrt" being the square root function, "StudentT(t,N)" being the Student-T probability distribution function of t and N degrees of freedom, and t being a fixed value that determines the accuracy that should be reached (e.g., a value of 0.05 means that with a probability of 95% the given value will lay inside M+/−(CI/2)).

Step 2: Calculating an overall LOR: One could consider several different calculations for a reasonable level of reliability based on those confidence intervals. However, it has been found that the most suitable approach is to only consider all those CIs of processing units being over a certain percentage/number of ticks and to ensure that those values all show a suitably small CI in relation to their value. That makes sense because for small values, the CIs may be relatively large and thus a naive algorithm could consider those values as "unacceptably bad". However, usually one is not interested at all in processing units that show small values. Thus it is suggested just to drop those and to concentrate on values above a certain threshold. Those again have to match the quality requirements by showing a suitably small confidence interval (meaning that the values show a suitably reliability). Thus, the algorithm mentioned in Step 1 must be altered to:

```
For each processing unit in the new profile:
    If "attached value" > threshold:
        [ Process as above ]
    Else
        Set CI to an escape value smaller than 0.
As LOR it is simply decided for
    LOR := 1/worstPU.CI
in order to reflect a desire to profile against the worst (biggest)
confidence interval.
```

Step 3: Determining the number of further necessary runs: The approximate number of runs still necessary to push the CI of the worst value below the threshold TCI can be calculated as follows:

For N:=0 to SomeSuitablyHighConstant
Let "T":=StudentT(t,N)
Let CI:=(T * worstPU.D)/(sqrt(N) * worstPU.M)
If CI<TCI then return N This algorithm ensures that after N runs altogether the value with the biggest CI has a CI of less than TCI. Thus, this assures an overall quality of the whole profile. The value SomeSuitablyHighConstant should be set reasonably high to still get a proper termination for correct runs but should not be set to a maximal value in order a) to maintain performance and b) to have a way to distinguish when the given profiles will presumably never converge. If, for instance, it is suspected that about 50 profiles might be necessary to reach the given accuracy, this value should be set to about the same order, e.g., 80. This would allow for some unexpected variance, but enable determination that something unexpected is going happening when the calculated N exceeds 80.

Bonferroni Correction: For some applications, it might be suitable to employ a Bonferroni Correction (a known statistical adjustment for multiple comparisons) in the algorithm described above.

Employing the techniques above, it is straightforward to build fully automated performance profiling frameworks that profile arbitrary applications with arbitrary profilers in such a way that the framework is able to decide autonomously at which point a certain accuracy of the gathered data is reached. One such overall solution might be the following iteration:

While true:
   Take another profile
   Load this profile and perform tests as described above
   If tests are not passed, drop the profile from evaluation and return to 'take another profile' step
   Else merge 'new profile' into averaged profile employing the techniques described above and determine the number of necessary runs as described above.
   If number of runs>=number of necessary runs output averaged profile plus confidence intervals and terminate gracefully FIG. 2 shows a block-schematic representation of this overall system, from which one of ordinary skill in the art will understand the transformations necessary for implementing an automated framework for performance profiling by statistical means utilizing the present invention as described above.

It will be appreciated that the method described above for automation of high quality performance profiling by statistical means is be carried out in software running on a processor in the computer, and that the software may be provided as a computer program element carried on any suitable data carrier (not shown) such as a magnetic or optical computer disc.

It will be understood that the matching of processing units based on statistical analysis of units and their child elements described above allows automation of high quality performance profiling by statistical means and provides the advantage of ensuring a certain level of quality of the profiles being gathered.

We claim:

1. A computer-implemented method of performance profiling software, comprising:
    producing a plurality of performance profiles of a software processing unit;
    performing statistical analysis on the plurality of performance profiles;
    determining a plurality of confidence intervals for the plurality of performance profiles; and
    determining a level of reliability metric for a performance profile from the plurality of confidence intervals.

2. The method of claim 1, wherein the step of performing statistical analysis comprises matching the performance profiles with at least one additional performance profile.

3. The method of claim 2, further comprising storing in the performance profiles an indication of a matching strategy used in the step of matching.

4. The method of claim 2, wherein the step of matching comprises matching data related to at least one of processes, threads, and similar processing units, over the plurality of performance profiles.

5. The method of claim 2, wherein the step of matching uses a matching strategy based on at least one of matching on process unit identifiers, simple matching on processing duration, matching on processing duration through clustering, and labeled matching at a predetermined level.

6. The method of claim 2, further comprising preprocessing based on at least one of processing unit processor affinity, containment of predetermined characterized data, and processing unit relevance.

7. The method of claim 2, further comprising storing in the performance profile a unique identifier correlated to a matching strategy used in the step of matching.

8. The method of claim 1, further including:
    determining if external noise in the performance profile does not exceed a predetermined limit, where external noise is defined as a variation in the performance profile caused by other processing units and applications; and
    conducting the statistical analysis based on the external noise determining.

9. The method of claim 8, wherein the step of determining if external noise in the performance profile does not exceed a predetermined limit comprises at least one of:
    determining processing duration of a single processing unit,
    determining processing duration of the performance profile,
    testing for same matching strategy across the plurality of profiles,
    testing for same environment across the plurality of profiles, and
    testing for maximal deviation in processing duration across the plurality of profiles.

10. The method of claim 1, wherein the step of determining a level of reliability metric further comprises:
    determining an amount of processing necessary to produce the level of reliability metric having a value greater than a predetermined value.

11. The method of claim 10, further comprising applying a Bonferroni correction.

12. A computer program product tangibly embedded in a storage unit, comprising computer program means for instructing a computer to perform the method of claim 1.

13. A system for performance profiling software, comprising:
    means for producing a plurality of performance profiles of a software processing unit;
    means for performing statistical analysis on the plurality of performance profiles;
    means for determining a plurality of confidence intervals for the plurality of performance profiles; and
    means for determining a level of reliability metric for a performance profile from the plurality of confidence intervals.

14. The system of claim 13, wherein the means for performing statistical analysis comprises means for matching the performance profiles with at least one additional performance profile.

15. The system of claim 14, further comprising means for storing in the performance profiles an indication of a matching strategy used by the means for matching.

16. The system of claim 14, wherein the means for matching comprises means for matching data related to at least one of processes, threads, and similar processing units, over the plurality of performance profiles.

17. The system of claim 14, wherein the means for matching is arranged to use a matching strategy based on at least one of:
    matching on process unit identifiers,
    simple matching on processing duration,
    matching on processing duration through clustering, and
    labeled matching at a predetermined level.

18. The system of claim 14, further comprising means for preprocessing based on at least one of:
    processing unit processor affinity,
    containment of predetermined characterized data, and
    processing unit relevance.

19. The system of claim 14, further comprising means for storing in the performance profile an identifier correlated to a matching strategy used by the means for matching.

20. The system of claim 13, further including:
    means for determining if external noise in the performance profile does not exceed a predetermined limit, where external noise is defined as a variation in the performance profile caused by other processing units and applications; and
    means for conducting the statistical analysis based on the external noise determining.

21. The system of claim 20, wherein the means for determining if external noise in the performance profile does not exceed a predetermined limit comprises means for at least one of:
    determining processing duration of a single processing unit,
    determining processing duration of the performance profile,
    testing for same matching strategy across the plurality of profiles,
    testing for same environment across the plurality of profiles, and
    testing for maximal deviation in processing duration across the plurality of profiles.

22. The system of claim 13, wherein the means for determining a level of reliability metric further comprises:
    means for determining an amount of processing necessary to produce the level of reliability metric having a value greater than a predetermined value.

23. The system of claim 22, further comprising means for applying a Bonferroni correction.

* * * * *